Oct. 21, 1924.  
F. N. PETTEGREW.  
1,512,634  
DRIVE FOR MOTOR VEHICLES  
Filed Aug. 25, 1920  
4 Sheets-Sheet 1

Inventor  
F. N. PETTEGREW.

Oct. 21, 1924.  1,512,634
F. N. PETTEGREW
DRIVE FOR MOTOR VEHICLES
Filed Aug. 25, 1920  4 Sheets-Sheet 2

Witness

Inventor
F. N. PETTEGREW
By
Attorneys

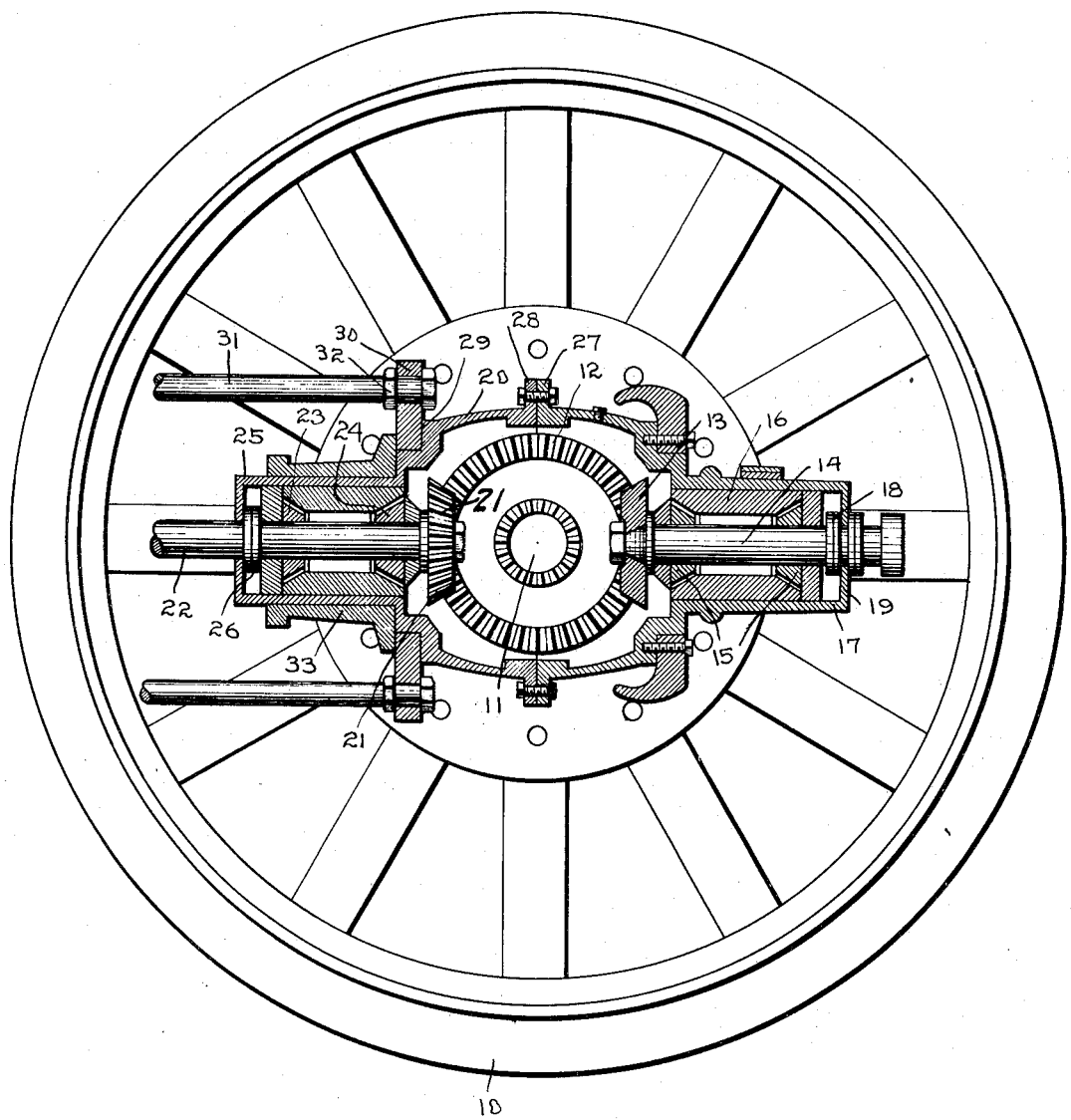

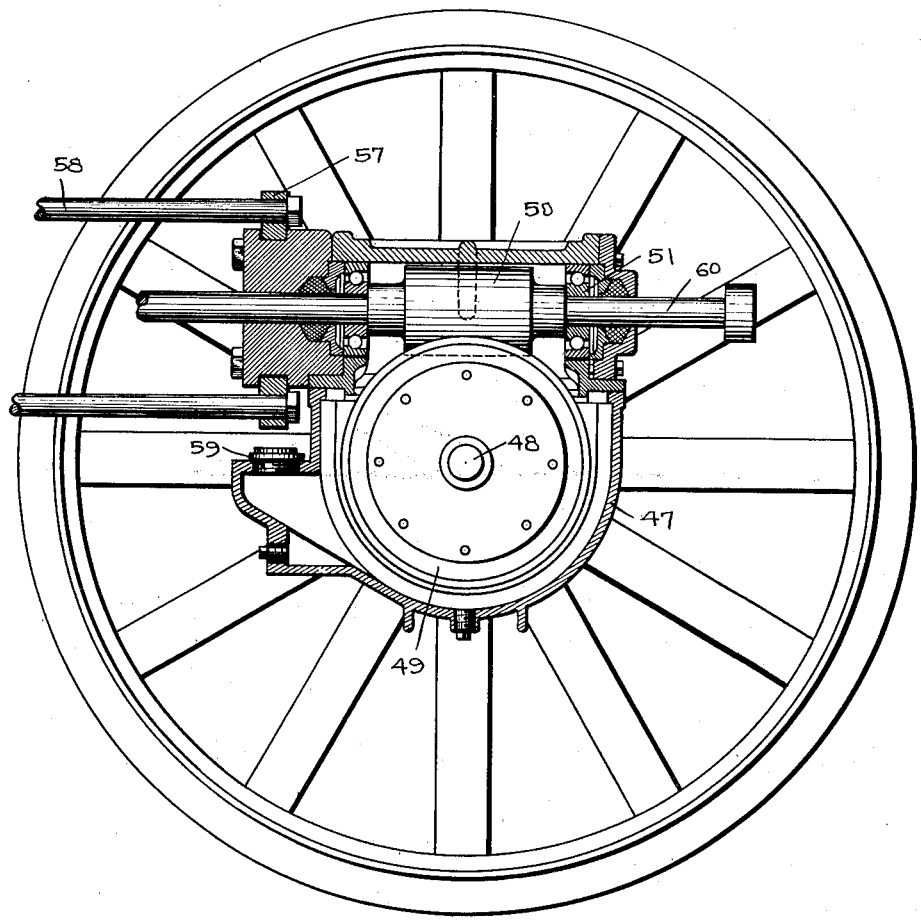

Patented Oct. 21, 1924.

1,512,634

UNITED STATES PATENT OFFICE.

FRED N. PETTEGREW, OF FOX LAKE, WISCONSIN.

DRIVE FOR MOTOR VEHICLES.

Application filed August 25, 1920. Serial No. 405,778.

*To all whom it may concern:*

Be it known that I, FRED N. PETTEGREW, a citizen of the United States, residing at Fox Lake, in the county of Dodge and State of Wisconsin, have invented a new and useful Drive for Motor Vehicles, of which the following is a specification.

The present invention relates to motor vehicles, and more particularly to the driving mechanism thereof, it being an object of the invention to provide more powerful traction for motor vehicles.

A further object of the invention is to provide a direct and positive driving connection for the rear axles of the vehicle, and to provide a device of this character to be employed with substantially any type of driving means now in use.

A still further object of the invention is to provide novel and improved means for bracing the driving axles of the vehicle to compensate for irregularities in the surface over which the vehicle is passing, and at the same time insure the necessary flexibility of the driving wheels.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 illustrates a sectional view through the housing disclosing the gearing employed on the forward drive axle of the rear wheels.

Figure 5 is a sectional view through a housing and worm gear, embodying a modified form of driving means.

Figure 1:
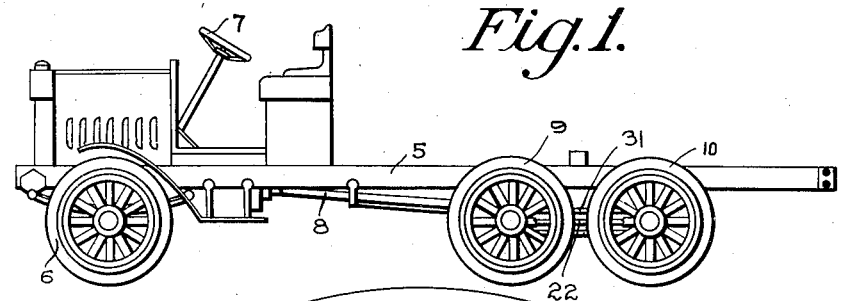
Figure 1 illustrates a side elevational view of a truck constructed in accordance with the present invention.

Referring to the drawings in detail, the reference character 5 designates the body of a truck, which is of the usual construction, and includes the front steering wheels 6, steering wheel 7 for controlling the front wheels, and the usual driving shaft 8, which has connection with the engine for imparting rotary movement to the rear wheels of the vehicle.

The present invention includes a novel form of driving mechanism and comprises rear driving wheels 9 and 10 arranged in pairs to increase the traction qualities of the vehicle, and designed to be connected with the usual driving shaft, to receive power therefrom.

As shown by Figure 3 of the drawings, the axle 11, which is the forward drive axle, has mounted thereon, a relatively large ring gear indicated at 12, which ring gear is in mesh with the gear 13 carried on one extremity of the relatively short shaft 14, which passes through the spaced bearings 15 that operate on the stationary bearings 16, which bearings are supported within the housing 17, the shaft 14 being however provided with collars 18 disposed on opposite sides of the end wall 19 of the housing to restrict movement of the shaft 14, longitudinally of the housing 17.

Meshing with the gear 12, at the opposite side of the housing 20 which houses the pinions 12 and 13, is a pinion gear 21 which is mounted on the forward extremity of the shaft 22, that is supported in the bearings 23 and 24.

These bearings 23 and 24 are supported in the rear extension 25 of the housing 20, so that the shaft will be permitted to rotate freely within its bearings, the collar 26 being secured to the shaft and contacting with one wall of the housing 25 to prevent movement of the shaft 22 longitudinally of the housing.

This housing 20 is formed in sections, each section being provided with a circumferential flange indicated at 27, which flanges abut, as shown by Figure 3, and are provided with a plurality of spaced openings to receive the securing bolts 28, whereby the sections of the housing may be secured together. Shoulders 29 form a part of the housing, and accommodate the collar 30 which is apertured to receive the brace rods 31, the nuts 32 being provided on the ends of the rods 31 to secure the rods to the collar 30.

In order that the collar 30 may be secured against displacement, a sleeve 33 is provided, which sleeve embraces the extension 25 of the housing, the inner extremities thereof abutting the collar 30 and forcing the same into close engagement with the shoulders 29. The rear ends of the rods 31 extend through the collar 34, and are secured thereto by means of the nuts 35, the collar being secured to the housing 36, which houses a portion of the rear drive axle 37, as by means of the securing bolts 38, the collar 34 being however fitted over the extension 39 of the housing 36.

The drive shaft 22 also extends rearwardly and has connection with the universal joint 40 as at 41, the universal joint 40 having connection with one end of the shaft 42, which in turn is mounted in suitable bearings indicated at 43 which are mounted in the extension 39.

On one extremity of the shaft 42 is secured a gear 44 which is in mesh with a relatively large ring gear 45 mounted in the housing 36, the sections of the housing 36 being secured together as by means of the bolts 46, so that an oil-tight connection between the sections of the housings may be maintained to permit the gears to operate in oil.

From the foregoing it is obvious that the forward extremity of shaft 14 may have connection with the main drive shaft through the means of suitable transmission, not shown, and that rotary motion of the drive shaft, which is indicated by the reference character 8, is imparted to the rear axle through the medium of the shaft 22, and that the housings 20 and 36 are maintained in proper spaced relation with each other by means of the rods 31.

Figure 4:
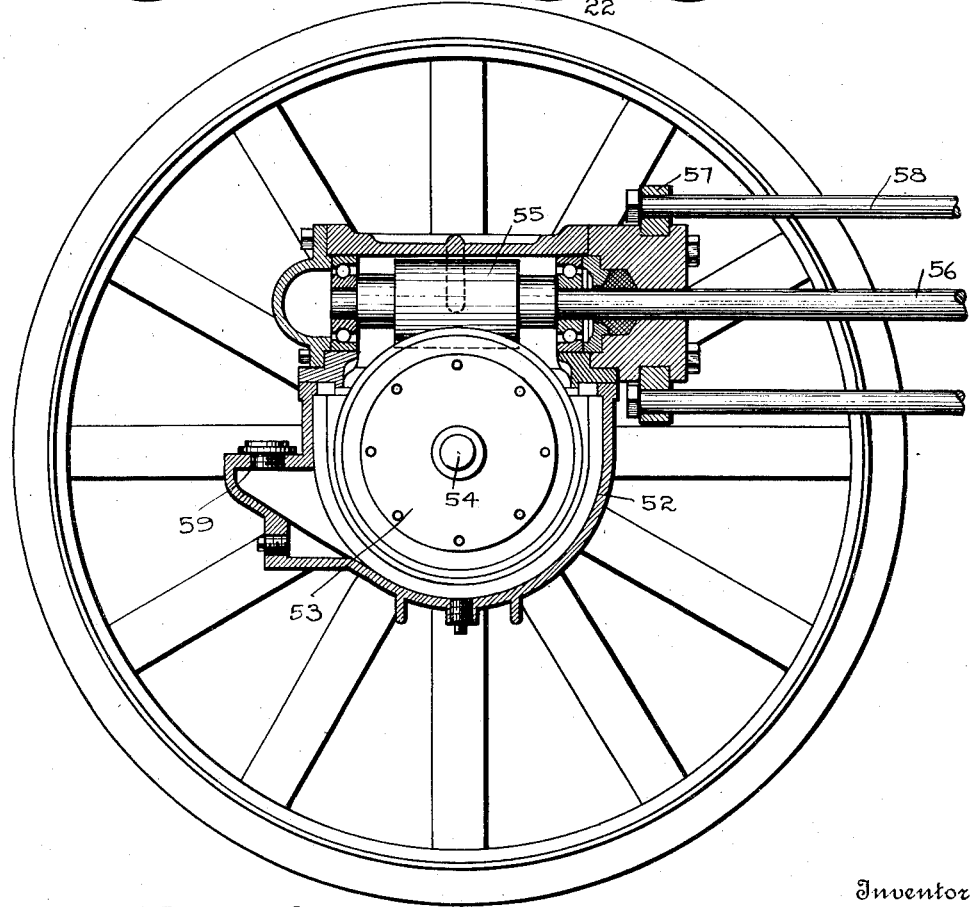
Figure 4 illustrates a longitudinal sectional view through the housing and worm gear construction employed in connection with the rear drive axle, the same being a modified form of the invention.
Figure 2:
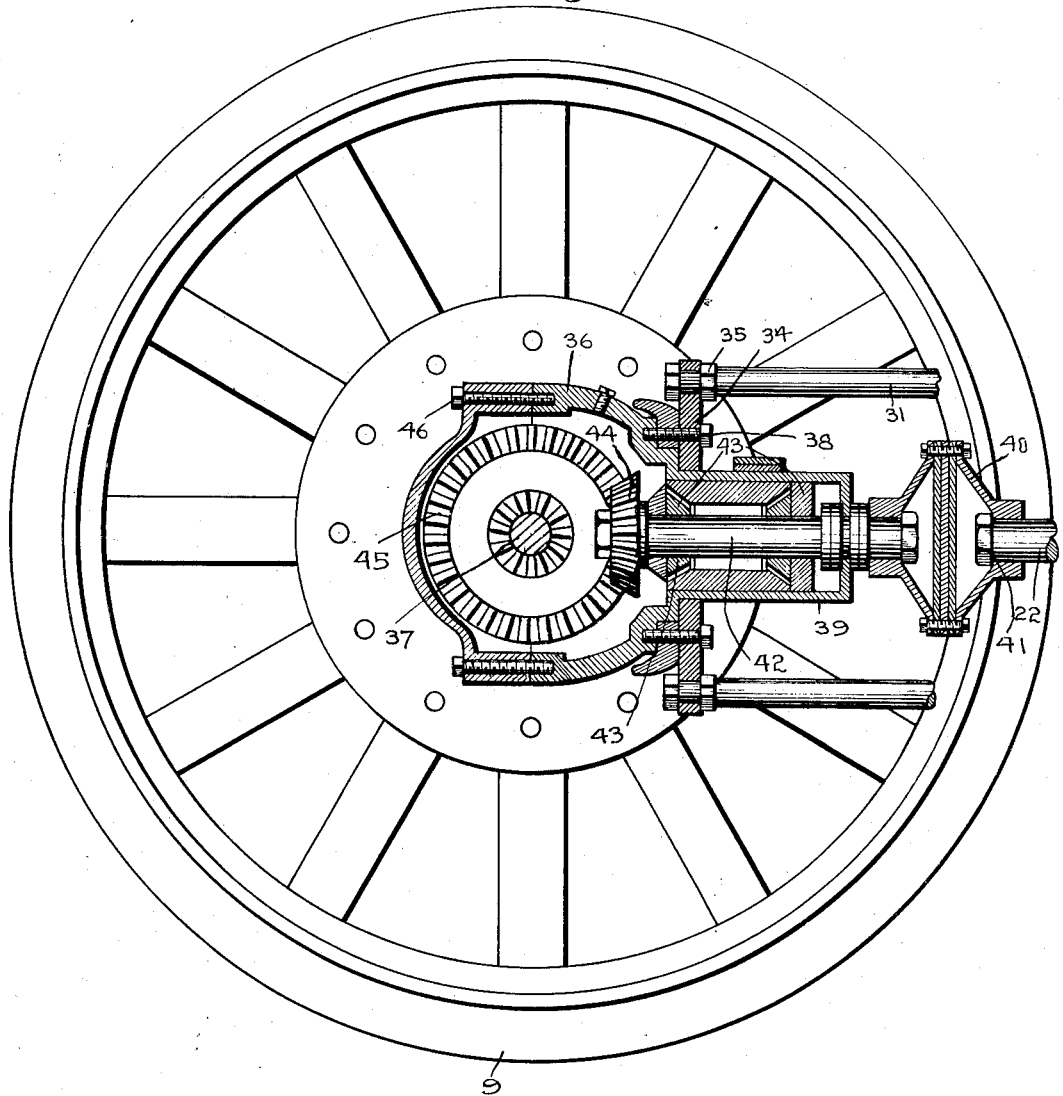
Figure 2 illustrates a sectional view through the housing disclosing the gearing employed on the rear drive axle of the rear wheels.

In the form of the invention as illustrated by Figures 4 and 5 of the drawings, the usual pinion drive has been supplemental by a novel form of worm gear drive and with reference to this construction, it will be seen that the housing indicated at 47, is disposed on the forward axle 48 and houses the pinion indicated at 49, which is secured to the axle 48 to move therewith, which pinion is in mesh with the worm indicated at 50, and which is supported in the bearings indicated at 51, so that rotary movement of the worm 50 is imparted to the pinion 49.

The housing 47 is connected with the rear housing 52 which is identical with the construction of the housing 47, and this housing 52 is designed to house the pinion 53 supported on the rear drive axle 54, and which is in mesh with the worm gear 55 mounted on the shaft 56, that extends forwardly and supports the worm gear 50 which is disposed in the housing 47 carried by the forward drive axle 48.

Suitable collars indicated at 57 are carried by the housings 47 and 52 respectively, which collars are connected by the spaced rods 58, so that the housings are maintained in proper spaced relation at all times. Each of these housings is provided with an oil filling opening 59 through which oil may be fed into the casings so that the gearing supported therein may operate in the oil and insure against the gears heating, at the same time, increasing the life of the gears.

It might be further stated that the extension 60, which passes through the casing 47 has connection with the main or drive shaft 8, through a suitable transmission, not shown.

Having thus described the invention, what I claim as new is:—

In a drive for motor vehicles, an axle carrying a beveled pinion, an axle housing including a forward extension, a shaft extending through the forward extension and carrying a pinion on one end thereof, meshing with the first mentioned pinion, said shaft being journalled in the forward end of the extension, bearings in the extension and disposed at opposite ends thereof, said bearings supporting the shaft, said shaft adapted to be connected to the propeller shaft of the vehicle, and means embracing the extension and having connection with the axle housing for holding the axle housing against movement.

In testimony that I claim the foregoing as my own.

FRED N. PETTEGREW